(12) United States Patent
Inoue et al.

(10) Patent No.: US 6,844,112 B2
(45) Date of Patent: Jan. 18, 2005

(54) SHEET FOR PROTECTING PAINT FILMS OF AUTOMOBILES

(75) Inventors: Tsuyoshi Inoue, Osaka (JP); Keiji Hayashi, Osaka (JP); Kenji Sano, Osaka (JP); Akira Wakabayashi, Osaka (JP); Kenichi Shibata, Osaka (JP); Shuuji Sugimoto, Osaka (JP); Komaharu Matsui, Kanagawa (JP); Takeshi Eda, Hyogo (JP); Hiroshi Ueda, Hyogo (JP)

(73) Assignees: Nitto Denko Corporation, Osaka (JP); Kansai Paint Co., Ltd., Hyogo (JP)

( * ) Notice: Subject to any disclaimer, the term of this patent is extended or adjusted under 35 U.S.C. 154(b) by 0 days.

(21) Appl. No.: 09/311,753

(22) Filed: May 14, 1999

(65) Prior Publication Data

US 2003/0190463 A1 Oct. 9, 2003

(30) Foreign Application Priority Data

May 19, 1998 (JP) ............................................. 10-155216
Sep. 10, 1998 (JP) ........................................... 10-276526

(51) Int. Cl.$^7$ ................................................ B32B 27/12
(52) U.S. Cl. ....................... 429/219; 428/220; 428/332; 428/340; 428/355 RA; 428/411.1; 442/394
(58) Field of Search ................................ 428/219, 220, 428/332, 340, 343, 355 RA, 411.1, 31, 337, 354, 474.4, 476.3, 480, 483, 500, 575, 923, 926; 427/155, 208.4, 208.8; 442/394, 395, 396, 398, 399, 71, 134, 148, 149–151

(56) References Cited

U.S. PATENT DOCUMENTS

| | | | | |
|---|---|---|---|---|
| 2,352,463 A | * | 6/1944 | Wenzelberger et al. ....... | 442/43 |
| 4,248,918 A | | 2/1981 | Hornibrook et al. | |
| 4,308,313 A | * | 12/1981 | Groff ........................... | 442/117 |
| 5,227,225 A | * | 7/1993 | Mamish ....................... | 428/214 |
| 5,246,773 A | * | 9/1993 | Mamish ....................... | 442/71 |
| 5,601,917 A | | 2/1997 | Matsui et al. ................ | 428/356 |
| 5,612,135 A | | 3/1997 | Matsui et al. ................ | 428/343 |
| 5,662,978 A | * | 9/1997 | Brown et al. ................. | 428/57 |
| 5,747,132 A | | 5/1998 | Matsui et al. ................ | 428/41.7 |
| 5,810,960 A | | 9/1998 | Matsui et al. ................ | 156/305 |
| 5,882,775 A | * | 3/1999 | Matsui et al. ................ | 428/213 |
| 6,037,054 A | * | 3/2000 | Shirai et al. ................. | 428/356 |
| 6,042,882 A | * | 3/2000 | Deeb et al. ............... | 427/208.4 |
| 6,083,613 A | * | 7/2000 | Hayashi et al. ........... | 428/315.7 |
| 6,129,964 A | * | 10/2000 | Seth ............................ | 24/306 |
| 6,319,353 B1 | * | 11/2001 | Mussig ....................... | 156/334 |

FOREIGN PATENT DOCUMENTS

| | | | |
|---|---|---|---|
| EP | 0 410 674 A2 | | 1/1991 |
| EP | 0 707 053 A2 | | 4/1996 |
| EP | 768354 A2 | * | 4/1997 |
| EP | 839886 A2 | * | 5/1998 |
| EP | 1 057 588 A2 | | 12/2000 |
| JP | 07-328528 A | * | 12/1995 |
| JP | 08-020751 A | * | 1/1996 |
| KR | 1982-0000388 A1 | | 3/1982 |

OTHER PUBLICATIONS

English Translation of Miyahara et al. (JP 08–020751 A).*
JPO Abstract Translation of JP 07–328528 A (Clipped Image No. JP407328528A).*
Machine Translation of JP 07–328528–A.*
JPO Abstract Translation of JP 08–020751–A (Clipped Image No. JP408020751A).*
Machine Translation of JP 08–020751–A.*
European Examination Report dated Aug. 7, 2002.
XP–002112752—Abstract (1998).
Partial European Search Report.

* cited by examiner

*Primary Examiner*—Kevin M. Bernatz
(74) *Attorney, Agent, or Firm*—Sughrue Mion, PLLC

(57) ABSTRACT

Sheets for protecting paint films of automobiles which can adhere with no wrinkle to paint films of automobiles and cover the same, even in curved surface portions, at a high reliability while achieving excellent protection function to colliding matters, etc. (i.e., the inherent function of protecting sheets) and being easily peeled and removed after completion of the aimed protection, thus preventing the permeation of rainwater, etc. and protecting the paint films of automobiles from being damaged by denaturation, etc. Such a sheet for protecting paint films of automobiles comprises a support (1) comprising a polymer film (12) having a nonwoven fabric (11) laminated on one or both surfaces thereof, and a pressure-sensitive adhesive layer (2) formed on one surface of the polymer film, wherein the non-woven fabric has a basic weight of 5 to 100 g/m$^2$.

2 Claims, 1 Drawing Sheet

SHEET FOR PROTECTING PAINT FILMS OF AUTOMOBILES

FIELD OF THE INVENTION

This invention relates to a sheet for protecting paint films of automobiles, which prevents paint films of automobiles from denaturation and discoloration and thus appropriately protects the surface of bodies or parts of automobiles.

BACKGROUND OF THE INVENTION

When loading automobiles, the parts thereof, etc., just finished painting on trucks or ships and transporting remote places such as overseas, etc., it has been a practice to coat the automobiles, the parts thereof, etc. with paints containing wax as the main component to give a thickness of 5 to 40 μm so as to prevent them from being damaged, frosted, discolored, etc., by various floating matters and colliding matters such as dirts, dusts and rainwater. However, this method suffers from some problems, for example, that uniform protection can be hardly achieved thereby due to difficulties in forming a wax coating film of a uniform thickness; that the paint film may be easily stained; that the paint film is liable to be damaged by acid rain; that the wax, etc. would ooze out onto the paint film and thus cause discoloration, etc.; that a large labor is required in forming the paint film; and that use of a solvent and the waste liquid treatment frequently cause environmental problems.

On the other hand, there are known various surface protecting sheets comprising a support and a pressure-sensitive adhesive layer formed thereon. JP-A-2-199184 and JP-A-6-73352 propose protecting sheets for painted adherends having films provided with radiation-cured pressure-sensitive adhesive layers with a lowered glass transition temperature or polyisobutyrene-based rubber pressure-sensitive adhesive layers (the term "JP-A" as used herein means an "unexamined published Japanese patent application"). The above-mentioned problems can be solved by using this sheet-like system.

However, the conventional protecting sheets suffer from a problem that when these sheets are peeled off from paint films of automobiles, there arise hardly repairable damages (i.e., discoloration or denaturation) of the paint films. These damages remarkably arise in particular in curved surface portions of automobiles.

To overcome these problems, the present inventors have conducted extensive studies and, as a result, found that the above-mentioned damages occur based on the following mechanism. Namely, rainwater or washing liquor (for example, window washer) penetrates into a paint film through wrinkles formed in the step of adhering a protecting sheet to an adherend. Next, the liquid is pooled in edges of entrapped air and concentrated therein due to the evaporation of moisture, thus causing the damages such as discoloration or denaturation of the paint film of automobile. Thus, it can be understood why curved surface portions with frequent wrinkle formation would be seriously damaged. Accordingly, the present inventors have studied to establish an adhesion cover system freed from wrinkles. However, wrinkling is unavoidable in the conventional protecting sheets.

SUMMARY OF THE INVENTION

Under these circumstances, an object of the present invention is to provide a sheet for protecting paint films of automobiles which can adhere with no wrinkle to paint films of automobiles and cover the same, even in curved surface portions, at a high reliability while achieving excellent protection function to colliding matters, etc. (i.e., the inherent function of protecting sheets) and being easily peeled off and removed after completion of the desired protection, thus preventing the permeation of rainwater, etc. and protecting the paint films of automobiles from being damaged by denaturation, etc.

The present invention provides a sheet for protecting paint films of automobiles, which comprises a support comprising a polymer film having a non-woven fabric laminated on one or both surfaces thereof, and a pressure-sensitive adhesive layer formed on one surface of the polymer film.

In these drawings, each numerical symbol shows:

1: support
11: non-woven fabric
12, 13: polymer films
2: pressure-sensitive adhesive layer.

DETAILED DESCRIPTION OF THE INVENTION

The present invention makes it possible to adhere a protecting sheet to an adherend surface with no wrinkle and cover the same, even in curved surface portions, at a high reliability owing to the high flexibility and appropriate stretch tolerance of the non-woven fabric and to prevent the permeation of rainwater, etc., thus avoiding the occurrence of hardly repairable damages such as the denaturation of paint films.

The film layer can prevent the permeation of rainwater, etc., capable of passing through the non-woven fabric. At the same time, the lamination of the film onto the non-woven fabric can achieve a desired durability while sustaining the above-mentioned follow-up performance. Moreover, the sheet can effectively protect the paint films against colliding matters, etc., and can be easily peeled off after achieving the aimed protection. When the support comprises a non-woven fabric alone, it cannot effectively prevent the permeation of rainwater, etc. When the support comprises a film alone, on the other hand, no satisfactory effect of protecting paint films against colliding matters can be achieved at a thickness allowing the adhesion with no wrinkle. When the protective function is satisfactorily achieved, it is impossible to adhere the sheet while forming no wrinkle.

Figure 1:
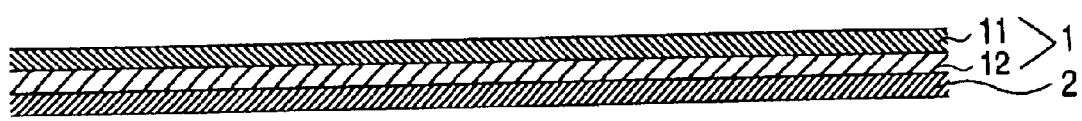
FIG. 1 is a sectional view of one embodiment of the sheet for protecting paint films of automobiles of the present invention.
Figure 2:
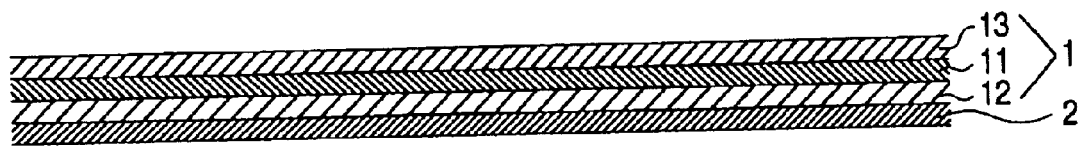
FIG. 2 is a sectional view of another embodiment thereof.

The sheet for protecting paint films of automobiles according to the present invention comprises a support comprising a polymer film having a non-woven fabric laminated on one or both surfaces thereof, and a pressure-sensitive adhesive layer formed on one surface of the polymer film surface. FIGS. 1 and 2 show examples thereof wherein (1) stands for a support, (11) stands for a non-woven fabric, (12) and (13) stand for each a polymer film, and (2) stands for a pressure-sensitive adhesive layer.

Although the non-woven fabric may be an arbitrary one, it is preferable to use those having a basis weight of from 5 to 100 g/m$^2$, preferably from 10 to 80 g/m$^2$ and more preferably from 20 to 60 g/m$^2$, from the viewpoints of, for example, the function of protecting paint films from colliding matters, etc., peeling workability after achieving the aimed protection, strength and wrinkle-free adhesion due to good follow-up performance.

The non-woven fabric may be made of appropriate fibers being excellent in water resistance, etc. Examples of the fibers include polyolefins such as polyethylene and polypropylene and mixtures thereof, fibers of thermoplastic polymers such as polyester and polyamide, regenerated cellulose fibers or semi-synthetic fibers such as rayon, cupraammonium rayon and cellulose acetate, natural fibers such as cotton, silk and wool, and mixtures (mixed fabrics) thereof. Of those, it is preferable to use non-woven fabrics made of thermoplastic polymer fabrics because of the excellent follow-up performance to curved surfaces, durability, etc.

The non-woven fabric may be one exhibiting ultraviolet barrier properties. Such a non-woven fabric is favorable since it can prevent the pressure-sensitive adhesive layer from deterioration, thereby causing no breakage and contributing to the establishment of long-lasting good peeling workability without remaining any adhesive. It is particularly preferable to use a non-woven fabric having an ultraviolet (wavelength: 190 to 370 nm) permeability of 10% or less.

An ultraviolet barrier non-woven fabric can be obtained by any appropriate methods, for example, by dispersing ultraviolet barrier particles in a non-woven fabric. Examples of these methods include a method comprising adhering a solution containing ultraviolet barrier particles to the surface of fiber constituting a non-woven fabric to thereby form a coating film; a method comprising forming the coating film on the fiber surface prior to the formation of a non-woven fabric and then constructing the non-woven fabric using the thus coated fiber; a method comprising processing a polymer containing ultraviolet barrier particles into fibers and then constructing a non-woven fabric using the fibers; and a method comprising combining these methods.

The coating solution as described above can be obtained by, for example, dispersing a binder component comprising an appropriate resin, etc., (for example, acrylic resin, urethane resin or polyester resin) and ultraviolet barrier particles in an appropriate medium such as an organic solvent (for example, toluene) or water. Alternatively, use may be made of commercially available coating solutions such as ZE-123™ or ZR-100™ each manufactured by Sumitomo Osaka Cement.

The coating solution is adhered to the fiber in an appropriate manner, for example, immersing the fiber in the solution, spraying the solution to the fiber or applying the solution to the fiber by gravure coating or reverse coating. Although the thickness of the coating film may be arbitrarily determined, it is preferably 40 $\mu$m or less, more preferably 20 $\mu$m or less and most preferably from 0.5 to 10 $\mu$m, taking the efficiency in the processing and formation of a thin film into consideration.

On the other hand, the non-woven fabric carrying the ultraviolet barrier particles dispersed therein can be obtained by, for example, mixing the ultraviolet barrier particles with a thermoplastic polymer, then processing the resulting mixture into fiber and piling up the same by an appropriate method for forming non-woven fabrics such as the melt blow method or the spun bond method.

The ultraviolet barrier particles which can be used are appropriate particles capable of reflecting or absorbing ultraviolet light, for example, titanium white, red oxide, zinc white, alumina, tin oxide and carbon black. Of those, it is preferable to use titanium white or zinc white, from the viewpoint of ultraviolet barrier effect, etc. The particle size of these ultraviolet barrier particles may be arbitrarily determined. In general, the average particle size thereof preferably ranges from 0.005 to 5 $\mu$m, more preferably from 0.01 to 1 $\mu$m and most preferably from 0.02 to 0.5 $\mu$m, so as to achieve a stable and long-lasting dispersion state, etc.

The film to be laminated on one or both surfaces of the non-woven fabric can be formed by using an appropriate polymer. When the good adhering workability with no wrinkle due to high flexibility, etc., is taken into consideration, it is preferable to use films made of polyolefin polymers such as polyethylene or polypropylene or a mixture thereof, or thermoplastic polymers such as polyamide or polyester. Polyolefin films are particularly preferable from the viewpoint of thermal disposal after peeling off.

To achieve a favorable function of protecting paint films against colliding matters, a good peeling workability after completion of the aimed protection, a high strength and good adhesion with no wrinkle due to good follow-up performance to curved surfaces, etc., the thickness of the polymer film is preferably from 5 to 40 $\mu$m, more preferably from 7 to 35 $\mu$m and most preferably from 10 to 30 $\mu$m.

The polymer film may be subjected to the ultraviolet barrier treatment as in the case of the above-mentioned non-woven fabric. The above-mentioned non-woven fabric, fiber constituting the same, coating film and polymer film may contain additives such as antioxidants and ultraviolet absorbers to prevent deterioration, etc., if necessary.

The polymer film is laminated on the non-woven fabric by any appropriate method, for example, heat lamination, use of an adhesive, etc., or extrusion of the polymer film on the non-woven fabric.

As shown in the attached figure, the support (1) comprising a laminate of the non-woven fabric (11) and the polymer films (12) and (13) is provided with the pressure-sensitive adhesive layer on one surface thereof. When the polymer film is provided on only one surface of the non-woven fabric as shown in FIG. 1, the pressure-sensitive adhesive layer is formed on the polymer film surface (12) in order to form a smooth pressure-sensitive adhesive layer surface. When the pressure-sensitive adhesive layer is directly formed on the non-woven fabric surface, the pressure-sensitive adhesive layer surface is liable to become rough and thus can only insufficiently prevent the penetration of rainwater, etc.

The pressure-sensitive adhesive layer can be formed by using an appropriate pressure-sensitive adhesive of the rubber or acrylic type without restriction. When a rubber type pressure-sensitive adhesive is used, it is preferable to select one comprising an aliphatic rubber polymer containing no or few unsaturated bonds, from the viewpoint of establishing a long-lasting and stable function, etc. Examples of such a rubber type polymer include polyisobutylene, butyl rubbers, A-B-A type block polymers such as styrene-ethylene/butylene copolymer-styrene (SEBS), styrene-ethylene/propylene copolymer-styrene (SEPS), styrene-butadiene-styrene (SBS) and styrene-isoprene-styrene (SIS), or hydrogenated products, and ethylene/vinyl acetate copolymer.

One or more base polymers can be used to prepare the pressure-sensitive adhesive. It is particularly preferable to use two or more base polymers having different molecular weight distribution. In the case of A-B-A type block polymers, it is preferable to use one comprising monomers having different molecular weight distribution or one having different styrene content, or to use the A-B-A type block polymers in combination with A-B type diblock polymers such as styrene-ethylene/butylene copolymer (SEB), styrene-ethylene/propylene copolymer (SEP), styrene-butadiene (SB) or styrene-isoprene (SI).

In the preparation of the pressure-sensitive adhesive, it is also possible to add appropriate tackifiers to control the adhesive characteristics thereof, etc., if needed. Examples of the tackifiers include terpene resins such as α-pinene polymers, β-pinene polymers, diterpene polymer and α-pinene/phenol copolymer; hydrocarbon resins such as aliphatic and aromatic resins and aliphatic and aromatic copolymers; rosin resins; coumarone and indene resins; (alkyl)phenol resins; and xylene resins.

Moreover, if needed, appropriate softeners suitable for the base polymers may be used to control the adhesive properties. Examples of these softeners include low molecular weight polyisobutylene and polybutene for the polyisobutylene, and paraffin oils for the A-B-A type block polymers. In addition, appropriate additives such as fillers, pigments, aging inhibitors and stabilizers may be used, if necessary.

The sheet for protecting paint films of automobiles can be formed in accordance with conventional methods for forming adhesive sheets, for example, a method which comprises applying a solution of a pressure-sensitive adhesive in a solvent or a heat-melted pressure-sensitive adhesive liquid to a definite surface of a support, and a method which comprises forming a pressure-sensitive adhesive layer on a separator and then transferring the same onto the definite surface of a support. The thickness of the pressure-sensitive adhesive layer may be arbitrarily determined. In general, the thickness ranges from 3 to 100 μm, preferably 70 μm or less and more preferably from 5 to 50 μm. If required and necessary, the pressure-sensitive adhesive layer may be protected until practically using by temporarily adhering thereto a separator, etc.

The sheet for protecting paint films of automobiles of the present invention is preferably used to protect the surface of the bodies or parts (bumper, etc.) of automobiles coated with films made of, for example, polyester/melamine, alkyd/melamine, acrylic/melamine, acrylic/urethane or acrylic/polyacid paints.

The present invention is described below in more detail by reference to the following examples, but the invention is not limited thereto.

EXAMPLE 1

A polypropylene film of 20 μm in thickness was laminated on one surface of a non-woven fabric made of polypropylene having a basis weight of 40 g/m². Onto the polypropylene film was applied a solution of a rubber-based pressure-sensitive adhesive comprising 80 parts (by weight, hereinafter the same) of polyisobutylene having an viscosity-average molecular weight of 1,000,000 and 20 parts of polyisobutylene having a viscosity-average molecular weight of 80,000 in toluene. After drying at 70° C. for 3 minutes, a sheet for protecting paint films of automobiles having a pressure-sensitive adhesive layer of 5 μm in thickness was obtained.

EXAMPLE 2

A sheet for protecting paint films of automobiles was obtained in the same manner as in Example 1 except for using a non-woven fabric made of polypropylene having a basis weight of 60 g/m².

EXAMPLE 3

A sheet for protecting paint films of automobiles was obtained in the same manner as in Example 1 except for using a non-woven fabric made of polypropylene having a basis weight of 20 g/m².

EXAMPLE 4

A sheet for protecting paint films of automobiles was obtained in the same manner as in Example 1 except for changing the thickness of the polypropylene film to 30 μm.

EXAMPLE 5

A sheet for protecting paint films of automobiles was obtained in the same manner as in Example 1 except for changing the thickness of the polypropylene film to 10 μm.

EXAMPLE 6

A sheet for protecting paint films of automobiles was obtained in the same manner as in Example 1 except for using a support obtained by laminating a polypropylene film of 20 μm in thickness on one surface of a non-woven fabric made of polypropylene having a basis weight of 40 g/m² and a polyethylene film of 20 μm in thickness on another surface thereof and forming a pressure-sensitive adhesive layer on the polypropylene film surface thereof.

COMPARATIVE EXAMPLE 1

A sheet for protecting paint films of automobiles was obtained in the same manner as in Example 1 except for using a polypropylene film of 10 μm in thickness as a substitute for the non-woven fabric/polypropylene film laminate support.

COMPARATIVE EXAMPLE 2

A sheet for protecting paint films of automobiles was obtained in the same manner as in Example 1 except for using a polypropylene film of 50 μm in thickness as a substitute for the non-woven fabric/polypropylene film laminate support.

COMPARATIVE EXAMPLE 3

A sheet for protecting paint films of automobiles was obtained in the same manner as in Example 1 except for changing the thickness of the polypropylene film to 50 μm.

COMPARATIVE EXAMPLE 4

A sheet for protecting paint films of automobiles was obtained in the same manner as in Example 1 except for forming a pressure-sensitive adhesive layer on the surface of the non-woven fabric.

EVALUATION TEST

The sheets for protecting paint films of automobiles obtained in the above Examples and Comparative Examples were subjected to the following tests.

Follow-up Performance to Curved Surface (Wrinkling):

When a sheet with poor follow-up performance is adhered to a curved surface, wrinkles are frequently formed. A sample of a protecting sheet (150 mm×150 mm) was adhered to the curved outer surface of an acrylic resin ball (200 mm in modulus). After 10 minutes, the formation of a gap due to peeling was examined, thus evaluating the follow-up performance to the curved surface.

Permeation of Water:

After completion of the evaluation of the follow-up performance to the curved surface as described above, the acrylic ball was placed with the edge of the protecting sheet upward. After spraying colored water thereon for 10 minutes, the protecting sheet was peeled off and the occurrence of the permeation of water was examined.

Protecting Properties (Resistance Against Tipping):

A protecting sheet was adhered to an acrylic/melamine paint film (Magicron, manufactured by Kansai Paint Co., Ltd.) formed on an iron plate. Next, 100 g of quartz sand No. 6 (particle diameter: 150 to 300 μm) was blasted to the protecting sheet under an air pressure of 4.0 kg/cm$^2$ in the direction of the gravity. Then the protecting sheet was peeled off and the formation of the traces of the quartz sand on the paint film were examined.

Peeling Properties:

A protecting sheet was adhered to an acrylic/melamine paint film formed on an iron plate by moving a rubber roll (2 kg) thereon back and forth at 23° C. After allowing to stand at 23° C. for 48 hours, the protecting sheet was peeled off and the peeling workability and adhesion strength (180° peel, peeling speed: 30 m/min) were examined.

The results obtained are shown in the Table below.

TABLE

|  | Follow-up performance to Curved surface | Permeation of water | Protecting properties | Peeling properties | Adhesion Strength (N/25 mm) |
| --- | --- | --- | --- | --- | --- |
| Ex. 1 | good | no | good | Good | 2.8 |
| Ex. 2 | good | no | good | Good | 3.1 |
| Ex. 3 | good | no | good | Good | 2.3 |
| Ex. 4 | good | no | good | Good | 2.1 |
| Ex. 5 | good | no | good | Good | 3.6 |
| Ex. 6 | good | no | good | Good | 2.0 |
| Comp. Ex. 1 | good | no | trace formed | Broken | — |
| Comp. Ex. 2 | gap formed | yes | good | Good | 3.0 |
| Comp. Ex. 3 | gap formed | yes | good | Good | 2.5 |
| Comp. Ex. 4 | good | yes | good | Good | 1.2 |

As shown in the Table shows, the sheets for protecting paint films of automobiles according to the present invention are excellent in the follow-up performance to curved surfaces, thus give little wrinkle, prevent the permeation of rainwater, etc., to thereby inhibit the discoloration, etc., of the paint films, protect the paint films of automobiles from colliding matters, etc. and can be easily peeled off after the completion of the aimed protection.

What is claimed is:

1. A method for protecting paint films of automobiles, which comprises providing a protective sheet comprising a support comprising a polymer film laminated on one or both surfaces of a non-woven fabric, and a pressure-sensitive adhesive layer formed on one surface of said polymer film opposed to the polymer film surface adhered to the non-woven fabric, wherein said non-woven fabric has a basis weight of 5 to 100 g/m$^2$ and said polymer film comprises a thermoplastic polymer, and applying said protective sheet to a paint film of an automobile, wherein when applied to curved surfaces, the protective sheet has substantially no wrinkles, prevents permeation of water, and is capable of protecting said paint film from colliding matter.

2. The method for protecting paint films of automobiles as claimed in claim 1, wherein said polymer film has a thickness of 5 to 40 μm.

* * * * *